(12) United States Patent
Frutuoso et al.

(10) Patent No.: US 12,312,515 B2
(45) Date of Patent: May 27, 2025

(54) SPRAYABLE HOT MELT ADHESIVE IN THE FORM OF PELLETS FOR MANUFACTURING DISPOSABLE HYGIENE ARTICLES

(71) Applicant: COLQUÍMICA-INDÚSTRIA NACIONAL DE COLAS, S.A, Valongo (PT)

(72) Inventors: Cristina Isabel Fernandes Frutuoso, Matosinhos (PT); Ana Paula Da Silva Coutinho, Alpendorada (PT)

(73) Assignee: COLQUÍMICA-INDÚSTRIA NACIONAL DE COLAS, S.A., Valongo (PT)

(*) Notice: Subject to any disclaimer, the term of this patent is extended or adjusted under 35 U.S.C. 154(b) by 144 days.

(21) Appl. No.: 18/181,341

(22) Filed: Mar. 9, 2023

(65) Prior Publication Data
US 2024/0287353 A1   Aug. 29, 2024

(51) Int. Cl.
*B32B 41/00* (2006.01)
*C09J 7/35* (2018.01)
*C09J 11/08* (2006.01)
*C09J 123/08* (2006.01)

(52) U.S. Cl.
CPC .................. *C09J 7/35* (2018.01); *C09J 11/08* (2013.01); *C09J 123/0815* (2013.01); *C09J 2301/304* (2020.08); *C09J 2301/312* (2020.08); *C09J 2301/408* (2020.08); *C09J 2301/414* (2020.08)

(58) Field of Classification Search
CPC ........ C09J 7/35; C09J 11/08; C09J 123/0815; C09J 2301/304; C09J 2301/312; C09J 2301/408; C09J 2301/414; C09J 123/10; C09J 153/00; C09J 153/02
USPC .................... 156/60, 64, 350, 351, 378, 379
See application file for complete search history.

(56) References Cited

FOREIGN PATENT DOCUMENTS

EP        3839002 A1 *   6/2021   .............. C09J 11/08

* cited by examiner

*Primary Examiner* — Michael N Orlando
*Assistant Examiner* — Joshel Rivera
(74) *Attorney, Agent, or Firm* — Frank Gao, Esq.

(57) ABSTRACT

The present invention refers to a sprayable hot melt adhesive composition based on olefin block copolymers and ethylene-octene copolymers, being its final form of supply pellets. More particularly, this invention refers to a hot melt adhesive composition which find utility in manufacturing nonwoven disposable articles such as diapers and feminine care products. The hot melt adhesive composition of the present invention is particularly useful in construction applications, where rheological behaviour, adhesion and flexibility are desired.

16 Claims, No Drawings

SPRAYABLE HOT MELT ADHESIVE IN THE FORM OF PELLETS FOR MANUFACTURING DISPOSABLE HYGIENE ARTICLES

FIELD OF THE INVENTION

The present invention refers to a sprayable hot melt adhesive composition based on olefin block copolymers and ethylene-octene copolymers, being its final form of supply pellets. More particularly, this invention refers to a hot melt adhesive composition which find utility in manufacturing nonwoven disposable articles such as diapers and feminine care products. The hot melt adhesive composition of the present invention is particularly useful in construction applications, where rheological behaviour, adhesion and flexibility are desired.

SUMMARY OF THE INVENTION

The present invention falls within the adhesive industry, more specifically the hot melt adhesive industry. Hot melt adhesives are products that are applied to the surface of a material in a molten state at high temperatures and harden when cooled to room temperature to form a bond between at least two materials. This means that these products are supplied to the user in a solid state and, later, heated and applied in a liquid state. In general, the application temperature of this type of product varies between 100° C. and 200° C.

Hot melt adhesives are used in a wide variety of industrial applications worldwide and can respond to a wide range of complex requirements in the adhesives industry. The hot melt adhesive market has seen exponential growth in recent decades due to the large-scale production of synthetic polymers.

Furthermore, in addition to the economic advantages, these types of adhesives also do not include organic solvents in their composition, which makes them an option of excellence due to the strong focus on sustainability that exists in this industry. Following this, and mainly due to the safety and non-toxicity of hot melt adhesives, in addition to other industries, these products are particularly useful in the hygiene and medical industries, manufacturing of a variety of disposable goods. Specific application includes disposable nonwoven products such as disposable diapers, sanitary napkins, adult incontinence briefs and surgical drapes.

Typically, within the hygiene construction industry, there are two main types of hot melt adhesives being used: amorphous poly alpha olefins (APAO) suitable for coating applications and styrene block copolymers (SBC) recommended for sprayable applications. The present invention relates to a hot melt adhesive that comes as an alternative to traditional hot melts used for construction applications.

Although the sprayable hot melt adhesives using an olefin block copolymer (OBC) are already introduced in this market, they have never been combined, at the same time, with ethylene-octene copolymers, since they are considered stiff and low-tack polymers, what is essential so that it is possible to supply the adhesive by pellets, but it is against the market requirements. Thus, it is mandatory that these characteristics are rewarded by the properties of the other components into the formulation, so that it is possible to supply by pellets, maintaining the desired performance for this type of application regarding processability, flexibility and adhesion.

The present invention has as its main objective to provide a hot melt composition which combines olefin block copolymer (OBC) and ethylene-octene copolymers and, therefore, can be sprayable and at the same time supplied by pellets, sustaining the excellent bond strength, processability and flexibility looked-for in the industry.

BACKGROUND OF THE INVENTION

The present invention solves a gap in the disposable articles industry. It describes a hot melt adhesive using a sprayable olefin block copolymer (OBC), which allows to be applied using the same application techniques as current styrene block copolymers (SBC) based technologies (coating and spray nozzles, including spiral and spray glue patterns). In addition, it allows an automatic feeding of the machines through the pellets form, due to its composition, combining the OBC with ethylene-octene copolymers, without its final performance (bond strength) is affected.

A standard hot melt adhesive composition will comprise the following types of raw materials:
  a polymer component consisting of at least one thermoplastic polymer capable of guaranteeing rheological properties suitable for its application. Such components can be polyolefins, ethylene vinyl acetate polymers, styrene block copolymers, among other;
  a tackifier component used for increasing adhesion strength to substrates, that can be selected from natural or synthetic resins. Some examples of natural resins include rosin resins, Tall Oil, polyterpenoid or terpene phenolic resins. Synthetic hydrocarbon resin may be selected from aliphatic (C5), aromatic (C9), aliphatic-aromatic (C5/C9) and dicyclopentadiene (DCPD) resins;
  additive components such as plasticizers or waxes that allow the adjustment of viscosity, softening point and open time of the hot melt adhesive. A plasticizer can be selected from liquid polybutenes, saturated hydrocarbons, mineral oils, naphthenic or hydrotreated paraffinic oils, and isobutylene-butene copolymer, among others. On the other hand, some examples of wax components include acrylic or carboxylic acid modified, polyolefin copolymer, Fischer-Tropsch and paraffin.

Examples of hot melt adhesive composition as described can be found in documents such as WO2011011729A1, U.S. Pat. No. 6,329,468B1, CN102498170A and U.S. Ser. No. 10/544,295B2.

Although the hot melt adhesive composition described in WO2011011729A1 and U.S. Pat. No. 6,329,468B1 comprises OBC and FPO (flexible polyolefin), respectively, with great impact on the processability when compared to APAO based adhesives, being applied via nozzle systems (sprayability). However, it is not possible to be supplied by pellets form, since its high-tack surface will not be preventing its self-sticking during manufacture, transport, and storage. For this reason, its automatic feeding cannot be real.

As in previous invention, the hot melt adhesive described in CN102498170A consist of an improved processability in the APAO based adhesives, due to its sprayability performance, furthermore, it has enhanced cohesion and flexibility to manufacture elastic layers used in disposable diapers. It is an OBC based adhesive with high-tack surface will not be preventing its self-sticking during manufacture, transport, and storage. For this reason, the adhesive cannot also be provided in the pellets form.

On the other hand, document U.S. Ser. No. 10/544,295B2 relates to tacky hot melt adhesives in the form of pellets, which are coated with nontacky cover material made of a polymeric film. Despite of its automatic feeding advantage, in their process is necessary an extra polymeric film, not being possible to extrude solely the adhesive composition in the pellets form. Besides that, the composition is not including OBC.

The present invention relates to a hot melt adhesive composition based on at least one olefin block copolymer (OBC) and an ethylene-octene copolymer, a tackifying resin, a plasticizer, and a synthetic wax or petroleum wax as the main raw materials. The sprayability is guaranteed by the OBC component, while ethylene-octene copolymer component will ensure the pellet form, blending-up without affecting the demanding industry of nonwoven disposable articles.

The hot melt adhesive of the present invention comprises an olefin block copolymer (OBC) with melt flow index at 190° C. inferior to 20 g/10 min and an ethylene-octene copolymer with elongation at break superior to 90% and a low-density polyethylene wax with a drop point 115° C. and a viscosity inferior to 500 mPa·s at 140° C. are used in combination, a hot melt composition with suitable rheological behavior can be obtained to complete the present invention. The high viscosity profile of this mixture in the wanted range of temperature can be balanced by adding of the plasticizer component. Additionally, the modulus values also increase due to the high crystallinity of the wax, ensuring a more suitable rheological behavior. However, due to the high drop point of the polyethylene wax, the softening point obtained for the hot melt composition is adjusted to the standard values for hot melt adhesives used for construction applications—from 75° C. to 100° C. blending resin and plasticizer in this composition.

ADVANTAGES OF INVENTION

According to the present invention, a hot melt adhesive composition provided comprises a sprayable OBC, which allows to be applied using the same application techniques as current SBC based technologies (coating and spray nozzles, including spiral and spray glue patterns). In addition, it allows an automatic feeding of the machines through the pellets form, combining the OBC with ethylene-octene copolymers, without its final performance (bond strength) is affected.

Typically, hot melt adhesives for construction market have high-tack surface, not being extruded in the pellets form, furthermore, when we combine OBC with ethylene-octene copolymers the mixture is too stiff causing adverse effect on the processability of the hot melt adhesive in the customer production line. Unpredictably, with the formulation of the present invention, it was possible to obtain the most excellent benefit of each of the one polymer and act in response to the strong demand of this industry.

The hot melt adhesive composition obtained in this invention has a solidification temperature in between 40° C. and 110° C. measured according to the rheometer test and a storage modulus superior to 0.3 MPa is obtained at a temperature in between 10° C. and 60° C. measured according to the rheometer test Consequently, the open time and setting time of the hot melt adhesive is suitable to make the non-woven bond strength acceptable for the disposable articles' companies.

Moreover, the described invention can be supplied in form of pellets, complying a solidification temperature in between 40° C. and 110° C. according to the rheometer test and a (tan(δ)) damping in between 0.1 and 4 at a temperature in between 15° C. and 45° C. measured according to the rheometer test.

In addition, no adverse effect on the processability of this hot melt adhesive will be noticeable in the construction applications, according to these criteria:
  a) for spraying application: complex viscosity is equal to 600-1 000 cP with a shear rate in between 15 000 and 30 000 $s^{-1}$;
  b) For coating application: complex viscosity is equal to 100-300 cP with a shear rate in between 100 000 and 250 000 $s^{-1}$.

DETAILED DESCRIPTION OF INVENTION

The object of the present invention is a hot melt adhesive composition comprising a polymeric component based on at least one olefin block copolymer (OBC) and an ethylene-octene copolymer; a tackifying resin; a plasticizer component; and a synthetic wax or petroleum wax. The sprayability is guaranteed by the OBC component, while the ethylene-octene copolymer component will ensure the pellet form, blending-up without affecting the demanding industry of nonwoven disposable articles.

The hot melt adhesive composition of the present invention is intended for application, namely, but not exclusively, in construction applications, where rheological behavior, adhesion and flexibility are desired.

Another object of the present invention is a sprayable hot melt adhesive in the form of pellets, in which properties such as viscosity, softening point, open time and setting time can be controlled by adjusting the amount of each component in the hot melt adhesive composition.

By "substrate" is meant the material or the surface of the material on which the hot melt adhesive is applied and/or directly contacted. In the context of disposable hygiene industry, the most common substrates are non-woven textiles and polyethylene film.

By "open time" is meant the maximum time interval, after the hot melt adhesive is applied to the first substrate, in which it is possible to effectively bond a second substrate.

By "setting time" is meant the minimum time interval in which pressure is required to be applied for two substrates to bond effectively. Thus, the setting time is associated with the speed with which the adhesive recovers its cohesive strength.

By "rheological behavior" is meant the analysis of the viscoelastic nature of the adhesive and its dependence on temperature variations.

By "suitable rheological behavior" is meant the change in material properties with temperature, which results in adequate technical properties such as open time and setting time.

By "bond strength acceptable" is meant the ability of the hot melt adhesive to penetrate the substrate in which it is applied and allow a second substrate to bond to the first in an efficient and permanent way.

By "suitable stiffness at room conditions" is understood a stiffness equal or less than 15 MPa.

By "room conditions" is meant (23±1) ° C. & (50±5) % HR.

According to the invention, the hot melt adhesive comprises:
  a polymeric component comprising of at least one polyolefin thermoplastic polymer, more specifically, at least one olefin block copolymer (OBC) and an ethylene-octene copolymer;

a resin component comprising of at least one resin of natural or synthetic origin;

a plasticizing component comprising at least one plasticizer capable of controlling rheological properties like viscosity;

an antioxidant component comprising at least one phenolic antioxidant capable of preventing degradation of the adhesive due to high temperature exposure;

a wax component comprising of at least one low density polyethylene wax.

Polymeric Component

The hot melt adhesive composition for construction applications in the disposable hygiene industry must include a polymeric component comprising at least one thermoplastic polymer capable of guaranteeing properties such as open time and setting time suitable for its application. The hot melt adhesive composition of the present invention is comprising of at least one olefin block copolymer (OBC) and an ethylene-octene copolymer.

In addition, the invention comprises an olefin block copolymer (OBC) with melt flow index at 190 CC inferior to 20 g/10 min measured according to test method ASTM D1238 and an ethylene-octene copolymer with elongation at break superior to 90% measured according to test method ASTM D638.

In addition, polymeric component comprises between 10% and 18% by weight, preferably between 12% and 16% by weight, of at least one olefin block copolymer (OBC) with melt flow index at 190° C. inferior to 20 g/10 min measured according to ASTM D1238 and between 9% and 17% by weight, preferably between 11% and 15% by weight, of an ethylene-octene copolymer with elongation at break superior to 90% measured according to ASTM D638.

The polymeric component should make it possible to obtain a hot melt adhesive with reduced tackiness after solidification. Furthermore, the polymeric component is responsible for the rheological properties suitable for its application.

The polymeric component content should be up to 60% by weight of the hot melt adhesive, preferably between 10% and 50%, more preferably between 15% and 45%, even more preferably between 20% and 40%, more precisely between 20% and 35%, more exactly between 25% and 30%.

Wax Component

The use of a wax component allows the adjustment of the solidification temperature, open time and setting time of the hot melt adhesive to values considered adequate, so that it can be easily applied in industrial production lines.

"Suitable solidification temperature" is understood as a solidification temperature between 40° C. and 110° C. measured according to the rheometer test.

By "suitable open time and setting time" is meant a solidification temperature in between 40° C. and 110° C. measured according to the rheometer test and a storage modulus superior to 0.3 MPa is obtained at a temperature in between 10° C. and 60° C. measured according to the rheometer test.

In addition, the wax component must be a low-density polyethylene wax with a drop point close to 115° C. measured according to ASTM D3954-94 and a viscosity inferior to 500 cP at 140° C. measured according to PN-EN ISO 3219.

The wax content should be up to 20% by weight of the hot melt adhesive, preferably between 1% and 15%, even more preferably between 3% and 15%, precisely between 4% and 10%.

Antioxidant Component

The use of the antioxidant component aims to prevent the degradation of the hot melt adhesive by the action of heat, either during its production, during application or during storage of the final product. For the present invention, the use of an antioxidant component comprising at least one primary, secondary or multifunctional antioxidants is particularly useful. Thus, selected antioxidants are considered suitable, namely, but not exclusively, from: phenolic antioxidants, phosphite antioxidants, thio-esters antioxidants or mixtures thereof.

The content of the antioxidant component suitable for the present invention corresponds to up to 5% by weight of the hot melt adhesive, preferably between 0.1% and 4%, and more preferably between 0.2% and 2%, even more preferably between 0.5% and 2%, more exactly between 1% and 1.5%.

Plasticizer Component

The use of the plasticizer component allows the adjustment of the viscosity and softening point of the hot melt adhesive to values considered adequate, so that it can be easily applied in industrial production lines.

"Suitable viscosity" is understood as a viscosity value at 150° C. between 1 000 and 8 000 mPa·s, more preferably between 1 500 and 6 000 mPa·s and even more preferably between 2 000 and 5 000 mPa·s measured according to ASTM D3236.

By "suitable softening point" is meant a softening point value comprised between 50 and 130° C., more preferably between 55 and 120° C., and even more preferably between 60 and 115° C. measured according to ASTM E28.

By ensuring that the formulation has the proper values for these properties, it is also ensured that the application temperature necessary when using the adhesive of the invention in industrial lines is adequate and that it must be between 100 and 200° C., more preferably between 120 and 180° C., and even more preferably between 130 and 170° C.

In addition, the plasticizer component must allow, through mixing with the polymer component, the hot melt adhesive to present an open time and setting time suitable for the production process. For this reason, the hot melt adhesive of this invention comprising a plasticizer component comprising at least one liquid plasticizer at room temperature, selected, in particular but not exclusively, from liquid polymers, saturated hydrocarbons, mineral oils, isobutylene-butene copolymer or hydrotreated paraffinic oils, preferably, distillate (petroleum) hydrotreated heavy naphthenic oils.

The plasticizer content should be up to 20% by mass of the hot melt adhesive, preferably between 1% and 15%, more preferably between 2% and 14%, even more preferably between 2% and 12%, more exactly preferably between 5% and 10%.

Resin Component

The main objective of the resin component is to ensure adequate adhesion to the materials used, namely, nonwoven fabrics.

The hot melt adhesive of the present invention contains a resin component comprising resin of natural or synthetic resin.

If the resin component is a natural resin, this natural resin is selected, namely, but not exclusively, from: rosin resins, glycerol, pentaerythrol, triethylene glycol or methyl ester rosin, partially or fully hydrogenated rosin resin, of Tall Oil, glycerol, pentaerythrol or methanol ester of Tall Oil resin, polyterpene resin or terpene phenolic resin.

In case the resin component is a synthetic resin, this synthetic resin is selected, namely, but not exclusively, from:

pure monomer resin or hydrocarbon resin. Preferably, a hydrocarbon resin which may be selected, namely, but not exclusively, from: aliphatic (C5), aromatic (C9), aliphatic-aromatic (C5/C9) and dicyclopentadiene (DCPD) resins, more preferably aromatic (C9), even more preferably hydrogenated aromatic (C9) and hydrogenated dicyclopentadiene (DCPD).

The resin content corresponds to up to 80% by weight of the hot melt adhesive, preferably between 10% and 75%, more preferably between 25% and 75%, even more preferably between 40% and 70%, more precisely between 50% and 60%.

Production Method

The method for the production of hot melt adhesive for mattress construction comprises the following steps:
1. mixing, the plasticizer component and the resin component and the wax component at a temperature between 130 and 150° C., until a homogeneous paste is formed. The process is started with these components, since they have low viscosity and, therefore, allow a uniform and rapid melting only by the action of temperature, without the need for agitation inside the mixer;
2. add constant stirring to the paste formed. After this mixture, the antioxidant component is added. It is important that it is added at this stage as it will prevent the degradation of the properties of resin component by prolonged exposure to temperature. It should not be added before resin component due to its very fine solid powder form, which make it very difficult to mix with plasticizer component;
3. next, this paste is mixed with polymeric component with constant stirring. This component is the most challenging to incorporate into the mix, due to its high viscosity. A constant temperature, selected between 130 and 150° C., must be maintained, as well as constant agitation, until it melts completely and the mixture presents a translucent, uniform, homogeneous and fluid appearance.

Embodiments of the Invention

To verify the results obtained with this formulation, as well as comparing it with a standard hot melt adhesives used in the construction applications, several tests were performed, and their results are shown in Table 1.

This invention is further illustrated by the following non-limiting examples.

In Example 1 are presented the results of a standard rubber based hot melt adhesive. The rheology of this hot melt adhesive composition is adequate for the production lines used in this market, by slot or spray nozzles. Despite of the solidification temperature is between 40° C. and 110° C., the storage modulus of 0.3 MPa is obtained at very distant from the required range (10° C. and 60° C.), as can be observed in Table 1. Consequently, the open time and setting time of the hot melt adhesive is not suitable to make the non-woven bond strength acceptable for the disposable articles' companies. Similarly, as shown by the results in Table 1, this formulation cannot be supplied in form of pellets, not complying a solidification temperature in between 40° C. and 110° C. and a (tan(δ)) damping in between 0.1 and 4 at temperature in between 15° C. and 45° C.

It was determined that the optimization of the properties mentioned in Example 1 is possible by reducing the content of oil component. In Example 2 is shown the information of a formulation of a hot melt adhesive for construction applications with technical properties and a rheological behavior considered appropriate. However, this composition has high-tack surface, not being possible to be supplied in the pellets form, as can be observed in Table 1, through the high value of tan (δ) between 15° C. and 45° C. So, it is not considered suitable for the present invention and is presented for comparison purposes only.

In Example 3 are presented the results of a hot melt adhesive composition which is composed by ethylene-octene copolymer and a standard amorphous poly alpha olefin. The composition was optimized in open time and setting time when compared to Example 1 and Example 2, can be supplied in pellets form and presenting an acceptable bond strength results. However, stiffness is still too high (22.15 MPa), which is obvious when compared to Example 1 and Example 2 (Table 1). Such high stiffness would inhibit the functionality of the production lines at the working temperature range of 140 to 160° C. For these reasons, this formulation is not considered suitable for this application, exhibiting an adverse effect on the processability of this hot melt adhesive.

Finally, the only solution encountered to solve the previous mentioned issues and fulfill all the requirements was the composition in Example 4. It was necessary to blend an olefin block copolymer (OBC) with melt flow index at 190° C. inferior to 20 g/10 min according to test method ASTM D1238 with an ethylene-octene copolymer with elongation at break superior to 90% according to test method ASTM D638 and a low-density polyethylene wax with a drop point close to 115° C. according to test method ASTM D3954-94 and a viscosity inferior to 500 mPa·s at 140° C. according to test method PN-EN ISO 3219. With this mixture, the viscosity, open time and setting time obtained are considerable suitable for usage in bonding disposable nonwoven articles, even being supplied in form of pellets, as can be observed by comparison with Example 1 and Example 2 in Table 1. Moreover, the rheological behavior obtained is suitable for the production lines used in construction bonding, both for coating and spraying applications, as can be seen by comparison with Example 3 in Table 1, through the complex viscosity results.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

TABLE 1

|  | Example 1 | Example 2 | Example 3 | Example 4 |
|---|---|---|---|---|
| Wax Component[A] | — | — | 5.5% | 7.0% |
| Resin Component[B] | 62.1% | 64.5% | 45.8% | 56.0% |
| Plasticizer Component[C] | 19.5% | 12.3% | — | 8.0% |
| Antioxidant Component[D] | 0.4% | 0.3% | 0.7% | 1.2% |
| Polymeric Component 1[E] | — | — | — | 14.4% |

TABLE 1-continued

|  | Example 1 | Example 2 | Example 3 | Example 4 |
|---|---|---|---|---|
| Polymeric Component 2$^F$ | — | — | 4.0% | 13.4% |
| Polymeric Component 3$^G$ | 18.0% | 22.9% | — | — |
| Polymeric Component 4$^H$ | — | — | 44.0% | — |
| Viscosity at 150° C.$^{\#1}$ | 1 200 cP | 5 000 cP | 4 200 cP | 3 700 cP |
| Softening point$^{\#2}$ | 85° C. | 89° C. | 91° C. | 98° C. |
| Stiffness at room conditions$^{\#3}$ | 0.03 MPa | 0.12 MPa | 22.15 MPa | 8.00 MPa |
| 0.3 MPa Modulus obtained at$^{\#4}$ | 4.7° C. | 21.8° C. | 48.2° C. | 25.7° C. |
| Solidification Temperature$^{\#4}$ | 64.5° C. | 79.6° C. | 54.1° C. | 60.3° C. |
| tan (δ) peak obtained at a temperature in between 15° C. and 45° C.$^{\#4}$ | 4.76 | 4.42 | 0.54 | 1.35 |
| Complex viscosity obtained at shear rate in between (15 000 and 30 000) s$^{-1\#5}$ | From 788 to 622 cP | From 1.309 to 991 cP | From 1.751 to 1.432 cP | From 1.189 to 964 cP |
| Complex viscosity obtained at shear rate in between (100 000 and 250 000) s$^{-1\#5}$ | From 272 to 150 cP | From 329 to 154 cP | From 694 to 409 cP | From 455 to 269 cP |
| Open time$^{\#6}$ | n.a.$^I$ | n.a.$^I$ | 20 s | 10 s |
| Setting time$^{\#7}$ | n.a.$^I$ | n.a.$^I$ | 5 s | 1 s |

Captions:

$^A$Wax component: low density polyethylene wax with a drop point 115° C. measured according to ASTM D3954-94 and a viscosity inferior to 500 cP at 140° C. measured according to PN-EN ISO 3219
$^B$Resin component: hydrocarbon resins
$^C$Plasticizer component: hydrotreated naphthenic oils
$^D$Antioxidant component: phenolic antioxidant
$^E$Polymeric component selected for the invention: olefin block copolymer (OBC) with melt flow index at 190° C. inferior to 20 g/10 min measured according to test method ASTM D1238
$^F$Polymeric component selected for the invention: ethylene-octene copolymer with elongation at break superior to 90% measured according to test method ASTM D638
$^G$Polymeric component typically used for construction formulations: styrene block copolymers
$^H$Polymeric component typically used for construction formulations: amorphous poly alpha olefins
$^I$Test not applicable to hot melt adhesives with this polymeric component
$^{\#1}$Test method: Brookfield, Thermosel System, ASTM D3236
$^{\#2}$Test method: Ring & Ball, ASTM E28
$^{\#3}$Test method: Stress-Strain Curve at (23 ± 1) ° C. & (50 ± 5) % HR, ASTM D638
$^{\#4}$Test method: Solidification Analysis, Rheometer ARES-G2, 25 mm, 0.85 g, 6° C./min, (10-0.1) %, 1 Hz
$^{\#5}$Test method: (TTS) Time Temperature Superpositioning & Cox-Merz, Rheometer ARES-G2, 25 mm, 0.35 g, (1-106) s$^{-1}$
$^{\#6}$Test method: Método Colquimica (MC) 129 a 160° C.
$^{\#7}$Test method: Método Colquimica (MC) 129 a 160° C.

The invention claimed is:

1. Sprayable hot melt adhesive for manufacturing disposable hygiene articles comprising:
   between 20% and 35% by weight of a polymeric component wherein the polymeric component consisting:
      at least one olefin block copolymer (OBC) with melt flow index at 190° C. inferior to 20 g/10 min measured according to ASTM D1238; and
      an ethylene-octene copolymer with elongation at break superior to 90% measured according to ASTM D638;
   between 1% and 15% by weight of a wax component;
   between 0.5% and 2% by weight of an antioxidant component;
   between 40% and 70% by weight of an resin component; and
   2% to 12% by weight of a plasticizer component, wherein the sprayable hot melt adhesive is in the form of pellets, wherein the sprayable hot melt does not have polypropylene.

2. Sprayable hot melt adhesive of claim 1, wherein the polymeric component comprises between 10% and 18% by weight of at least one olefin block copolymer (OBC) with melt flow index at 190° C. inferior to 20 g/10 min measured according to ASTM D1238 and between 9% and 17% by weight of an ethylene-octene copolymer with elongation at break superior to 90% measured according to ASTM D638.

3. Sprayable hot melt adhesive of claim 1, wherein the antioxidant component is selected from phenolic antioxidants, phosphite antioxidants, thio-esters antioxidants or mixtures thereof.

4. Sprayable hot melt adhesive of claim 1, wherein the wax component is a low density polyethylene wax with a drop point 115° C. measured according to ASTM D3954-94 and a viscosity inferior to 500 cP at 140° C. measured according to PN-EN ISO 3219.

5. Sprayable hot melt adhesive of claim 1, wherein the resin component is a natural or synthetic resin.

6. Sprayable hot melt adhesive of claim 4, wherein said natural resin is a resin selected from rosin resins, glycerol, pentaerythrol, triethylene glycol or methyl ester rosin, partially or fully hydrogenated rosin resin, of Tall Oil, glycerol, pentaerythrol or methanol ester of Tall Oil resin, polyterpene resin or terpene phenolic resin.

7. Sprayable hot melt adhesive of claim 4, wherein said synthetic resin is a resin selected from pure monomer resin or hydrocarbon resin.

8. Sprayable hot melt adhesive of claim 6, wherein said hydrocarbon resin is a resin selected from: aliphatic (C5), aromatic (C9), aliphatic-aromatic (C5/C9) and dicyclopentadiene (DCPD) resins, aromatic (C9), hydrogenated aromatic (C9) and hydrogenated dicyclopentadiene (DCPD).

9. Sprayable hot melt adhesive of claim 1, wherein plasticizer component is at least one liquid plasticizer at room temperature, selected from liquid polymers, saturated hydrocarbons, mineral oils, isobutylene-butene copolymer, hydrotreated paraffinic oils or distillate hydrotreated heavy naphthenic oils.

10. Sprayable hot melt adhesive of claim 1, wherein the solidification temperature is comprised between 4° and 110° C. measured according to Solidification Analysis, Rheometer ARES-G2, 25 mm, 0.85 g, 6° C./min, (10-0.1) %, 1 Hz.

11. Sprayable hot melt adhesive of claim 1, wherein the softening point is comprised between 5° and 130° C. measured according to ASTM E28.

12. Sprayable hot melt adhesive of claim 1, wherein the storage modulus superior to 0.3 MPa is obtained at a temperature in between 10° C. and 60° C. measured according to the rheometer test.

13. Sprayable hot melt adhesive of claim 1, where in the viscosity is comprised between 1 000 and 8 000 mPa·s at 150° C. measured according to ASTM D3236.

14. Process for producing the sprayable hot melt adhesive of claim 1, characterized in that it comprises the following steps:
   a) Mixing the plasticizer component and the resin component and the wax component, at a temperature between 13° and 150° C., until a paste is formed with a homogeneous appearance;
   b) Adding the antioxidant component to the paste formed in the previous step;
   c) To the mixture obtained in the previous step, add the polymeric component with constant stirring and constant temperature, selected between 13° and 150° C., until it melts completely and the mixture presents a translucent, uniform, homogeneous and fluid appearance; and
   d) extruding the final product as pellets.

15. Disposable hygiene articles comprising the hot melt adhesive of claim 1.

16. Non-woven disposable articles comprising the hot melt adhesive of claim 1.

* * * * *